May 21, 1935.  L. G. LOMBI  2,001,792
RAVIOLI MACHINE
Filed June 14, 1934   2 Sheets-Sheet 1
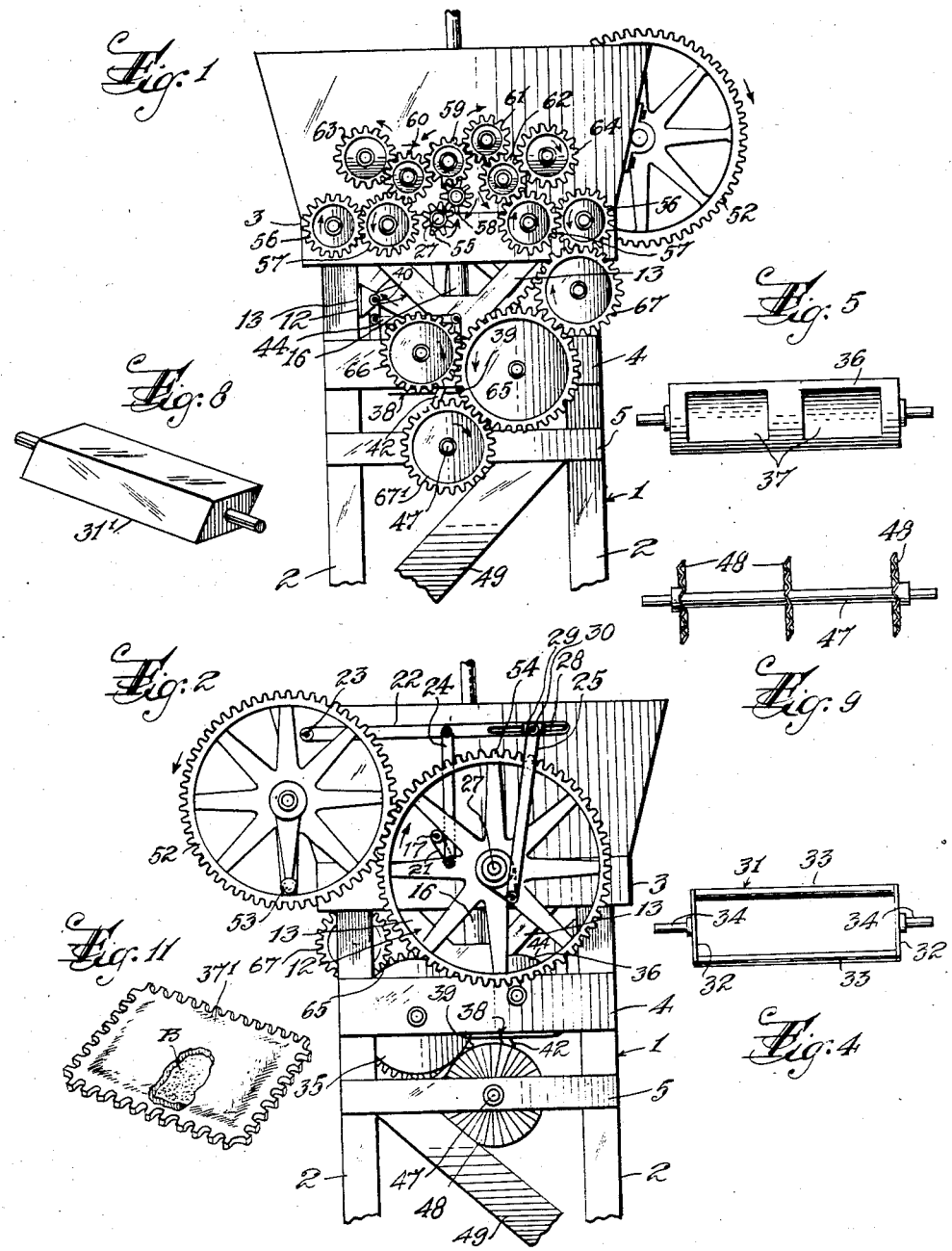

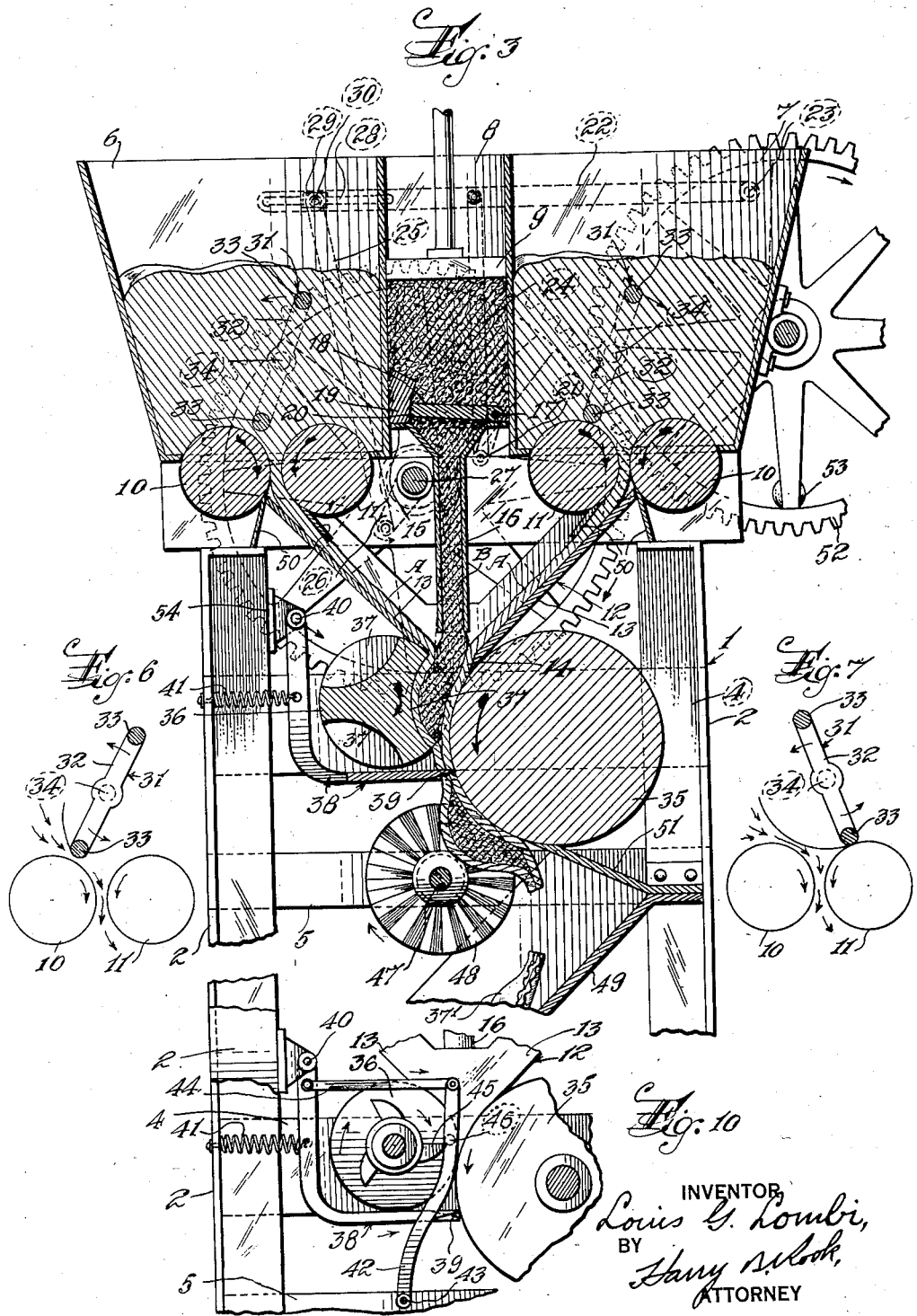

Patented May 21, 1935

2,001,792

UNITED STATES PATENT OFFICE 2,001,792

RAVIOLI MACHINE

Louis G. Lombi, Teaneck, N. J.

Application June 14, 1934, Serial No. 730,637

11 Claims. (Cl. 107—1)

My invention relates to pastry making machines, and more specifically to improvements in mechanism for making filled pastries particularly ravioli. Heretofore in sheeting dough by means of rotating rolls, the dough is frequently torn by the pull of the rolls against the supply of dough due to back drag of the supply, or else attenuated so that the sheet is not of uniform thickness or else the continuity of the sheet is broken. Furthermore, difficulty is encountered in making the dough in the sheets of uniform and proper consistency. Therefore, one object of my invention is to provide novel and improved means for forming from a lump or mass of dough, a continuous strip of dough of uniform thickness and consistency.

Another object of my invention is to provide an efficient mechanism for forming ravioli cakes from sheets of dough, and comminuted filler material, and embodying improved means for forming said sheets and introducing the filler material therebetween.

Specifically my invention is directed toward providing a machine for the above described purpose, which is equipped with a novel arrangement of sheeting rolls for forming the dough into sheets, and novel means for intermittently introducing filler material between said sheets and varying the quantity introduced.

Another object is to provide in such a machine rotating means for kneading dough in a dough supplying hopper, and forcing it between a pair of dough sheeting rolls, said means cooperating with one of said rolls to sever the dough against said roll to prevent the dough from being wound upon said rotating means and pulled thereby from between said rolls.

Other objects together with the structural details of my invention will be readily apparent when the following description and claims are read in conjunction with the drawings accompanying and forming a part of this specification.

In said drawings,

Figure 1 is a view in side elevation, partly broken away, of a machine embodying my invention.

Figure 2 is a similar view looking at the opposite side of the machine.

Figure 3 is a view in longitudinal section.

Figure 4 is a side elevation of a feeder and kneader for cooperation with dough sheeting means as presently described.

Figure 5 is a view of a die roll for forming the ravioli cakes.

Figure 6 is a diagrammatic view illustrating the manner in which the feeder cooperates with the dough sheeting means.

Figure 7 is a similar view with said feeder in another position.

Figure 8 is a perspective view of a modified form of said feeder.

Figure 9 is an elevational view of a series of disk knives for cutting the cakes apart.

Figure 10 is a detail view of a cutting knife and operating mechanism therefor and for a purpose presently described, and Figure 11 is a perspective view of one of the ravioli cakes produced by the mechanism of my invention.

Proceeding now to a detailed description of my invention, and with reference to the drawings, I designates the machine base which preferably comprises standards 2, side bars 3 extending across the top of the same, and upper and lower intermediate side bars 4 and 5.

Suitably secured upon the side bars 3, is a pair of open bottomed dough supplying hoppers 6 and 7 located at opposite ends of the base, and a filler supplying hopper 8 intermediate said hoppers 6 and 7. A weighted compression member 9 is positioned in the hopper 8 to facilitate discharge of the filler therefrom.

Extending across the bottom of each hopper 6 and 7 is a pair of cooperating forming rolls 10 and 11, rotatably mounted in spaced apart relation for rolling a sheet A from dough supplied thereto.

Below said pairs of forming rolls is a fixed chute 12 having flat downwardly converging bottom walls 13 for directing the sheets A into downwardly converging relation, and a centrally located throat 14 for the discharge of said sheets in contiguous opposed relation.

The filler supplying hopper 8 is provided with a hopper bottom 15 and vertical discharge chutes 16 depending therefrom and terminating above the throat 14 to discharge the filler material B between the opposed sheets of dough. Associated with the hopper 8 is means for intermittently feeding a uniform quantity of filler material B from the hopper 8 into the discharge chutes 16 and for varying said quantity at will. Referring in detail to said means, pivoted at one edge, within said hopper 8, as by the rod 17, is a flap member 18 designed for vertical oscillation relative to a fixed lip member 19 into hopper opening and closing positions, respectively. In its opening positions the free edge of said flap is located above said lip and the filler material B is free to enter between said members. An arcuate face 20 is provided on the lip 19 for wiping engagement by the free edge of said flap 18 whereby said flap may assume different closing positions. Movement of the flap 18 to closing position forcibly ejects the filler material B into the discharge chutes 16 as will be obvious. The flap member 18 is oscillated through the medium of a crank arm 21 fast on one end of the rod 17, exteriorly of the hopper 8, a variable throw lever 22 pivoted at one end to one side of the hopper 7, as at 23, a link 24 connecting the crank arm 21 to the lever 22, and a link 25 pivotally connected at one end to the free end of the variable throw lever 22 and having its other end connected to a crank arm 26 fast on a transverse shaft rotated by means presently described. The link 25 is adjustable along the lever 22 by means of a slot 28 in the latter, a sliding block 29 to which said link is pivoted, and a clamping screw 30 for screwing said block in selected position. Obviously by setting the link 25 relative to lever 22 the throw of the latter, and hence that of the flap member 18, may be varied to correspondingly vary at will the quantity of filler B discharged from the hopper 8 and chutes 16.

Associated with each pair of forming rolls 10 and 11 is dough kneading, feeding, and severing means as follows. Rotatably mounted in each hopper 6 and 7 above each pair of said rolls is a rectangular frame 31 (Figures 3 and 5) including end bars 32 and cylindrical cross bars 33, the former having centrally located studs 34 by which the frame 31 is journaled for rotation about an axis parallel with the axis of its associated pair of rolls. Each frame 31 is positioned so that, when rotated in the direction indicated by the arrows in Figure 3, the cross bars 33 will rotate in the opposite direction from and slightly clear one forming roll of their associated pair to force the dough between the rolls, and rotate in the same direction as and subsequently wipe against the other roll of said pair. The result of this arrangement is that the dough is kneaded and forced between said rolls, the bars 33 acting in conjunction with one of said rolls to sever the dough and thereby prevent the dough from becoming wound around the feeder and from being pulled from between said rolls by the drag of the mass in the hopper and by upward movement of the frame.

It will be noted that the bars 33 of the frame 31 on one side of the axis of the frame act successively against the dough to urge the same in the general direction of the feed of the rolls 10 and 11 and thereby continuously force the dough between said rolls so that a sheet of uniform thickness and consistency is formed by the rolls. On the other side of said axis the dough is subsequently severed and similarly acted upon in a direction opposite to the feed of said rolls to prevent the sheet from being torn by back drag of the dough in the hopper and also to prevent the dough from winding on the frame.

If desired a blade 31', substantially diamond shaped in cross section, as shown in Figure 8, may be used in lieu of the frame 31.

Journaled in the bars 4, below the chute 12, is a pair of large and small pressure and die rolls 35 and 36, respectively, arranged to receive therebetween the filled sheets as they are discharged from the throat 14. The die roll 36, (see Figures 3 and 5) is provided with three series of concavities 37 spaced apart longitudinally and circumferentially thereof so that said rolls will form therebetween transverse series of filled cakes 37a with the sheets pressed together between each series and also between the cakes in each series. A knife member 38, preferably of bell crank form and having a serrated edge 39, is pivoted as at 40 to a fixed part of the machine for movement against a tensioning spring 41, to sever the sheets of dough between the series of cakes 37a. A lever 42 pivoted at its lower end to one of the lower cross bars 5, as at 43, is operatively connected to the knife member 38, by a link 44, to move said knife member against the roll 35. A three arm tappet member 45 fast on one end of the die roll 36 wipes against a pin 46 on said lever 42 to operate the latter in properly timed relation to formation of the series of cakes 37 by the die and presser rolls 35 and 36.

Fast upon a rotary shaft 47 rotatably mounted in the lower cross bars 5 is a series of rotary disklike knives 48 contacting the periphery of the pressure roll 35 and spaced apart to separate the cakes 37a of each series, after the latter are ejected by the pressure and die rolls 35 and 36. An inclined chute 49 is provided for receiving the separated cakes 37a.

Stripping blades are provided for the forming rolls 10 and 11 as shown at 50 and a similar blade 51 is associated with the pressure roll 35. Coming now to the driving mechanism proper, a large driving gear 52 is provided on one side of the machine for rotation by means of a crank 53 thereon in a clockwise direction as viewed in Figures 1 and 3. Gear 52 meshes with a large gear 54 fast in one end of the before mentioned shaft 27 and drives the latter in a counter-clockwise direction, thereby oscillating the before mentioned flap member 18 through the medium of the crank arm 26, link 25 variable throw lever 22, link 24 and crank arm 18 as will be clear from the previous description of these elements. Fast in the shaft 27, and on the side of the machine opposite to gears 54 is a small gear pinion 55. The forming rolls 10 and 11 of each pair are geared together, on the same side of the machine as pinion 55, for rotation in opposite directions by a pair of gears 56 and 57, respectively. One roll gear of each pair is driven in the proper direction, indicated by the arrows in Figure 1, by the pinion 55 and through the medium of suitably arranged idlers, 58, 59, 60, and 61, and 62. Pinion 55 and said idlers also drive the frames 31 through the medium of gears 63 and 64 fast on one of the studs 34 of said frames, respectively. The pressure and die rolls 35 and 36 are geared together by gears 65 and 66 one of which is driven in the proper direction by one of the forming roll gears and through the medium of an idler gear 67. Gears 65, 66, and 67 constitute a reduction gearing for driving the die and pressure rolls 35 and 36 in proper ratio relative to the forming rolls 10 and 11 for a purpose whch will be clear. The knives 48 are driven by means of a gear pinion 67' fast on the shaft 47 and meshing with the gear 65.

The foregoing mechanism is well adapted for producing ravioli pastries of uniform size and weight particularly by virtue of the described means for ejecting the filler from its hopper and for varying the quantity ejected. As will be understod said filler is usually grated cheese, which does not readily feed under the action of gravity and which tends to stick in a hopper or other receptacle. My novel flap member and its operating mechanism act as a forced feed or ejector overcoming any tendency of the filler to stick and provide for a wide range of variations to accurately predetermine the quantity to be ejected and to time the ejecting operation as desired.

The described means for kneading the dough, forcing it between the forming rolls 10 and 11 and severing the dough from the supply provides for a positive feed of dough and hence dough strips of uniform thickness and consistency, and prevents the dough from being torn above said rolls by the pull of the latter against the drag of the supply in the hoppers so that continuity of the strips is ensured.

The foregoing constitutes a detailed description of a preferred embodiment of my invention and one modification thereof and it is thought that its operation will be clear therefrom. It is to be understood however that the invention is not to be confined to the precise details disclosed and is susceptible of modification, other than that disclosed, within the scope of the appended claims.

Having thus described my invention, what I claim is:

1. In a machine of the class described, the combination with a dough supplying hopper, and dough sheeting means including cooperating rolls, of means for forcing dough between said rolls and operative in conjunction with one of said rolls to sever the dough against said roll from the supply in said hopper.

2. In a machine of the class described the combination with a dough supplying hopper, and dough sheeting means including cooperating rolls, of a rotary member for forcing dough between said rolls and operative in conjunction with one of said rolls to sever the dough against said roll from the supply in said hopper, and means for rotating said member.

3. In a machine of the class described, the combination with a dough supplying hopper, and dough sheeting means including a pair of cooperating rolls, of means for forcing the dough between said rolls and operative to sever the dough against one of said rolls from the supply in the hopper, and including a rotary member rotating in the opposite direction from and clearing one roll and rotating in the same direction as and wiping against the other roll.

4. In a machine of the class described, in combination, a pair of laterally spaced dough supplying hoppers, a filler supplying hopper intermediate the same, cooperating dough sheeting rolls at the bottom of each dough supplying hopper, an inclined chute for directing sheets from said rolls into downwardly converging relation below the filler supplying hopper, means for intermittently ejecting filler material from the bottom of said filler supplying hopper, and settable means for selectively varying the quantity of filler material ejected.

5. In a machine of the class described, in combination, a pair of laterally spaced dough supplying hoppers, a filler supplying hopper intermediate the same, a pair of dough sheeting rolls at the bottom of each dough supplying hopper, an inclined chute for directing sheets for the dough supplying hoppers into downwardly converging relation below the filler supplying hopper, means for intermittently ejecting filler material from the bottom of the filler supply hopper, and means for forcing the dough in said supplying hoppers between said rolls and including a pair of frames associated with said pairs of rolls, respectively, said frames clearing one roll of their related pair and wiping against the other.

6. In a machine of the class described, in combination, dough sheeting means, a filler supplying hopper, means for directing sheets from the dough sheeting means into opposed spaced apart relation, forced feed mechanism for the dough sheeting means, and means for intermittently ejecting filler material from said hopper between said sheets and including settable means for varying the quantity of material ejected.

7. In a machine of the class described, in combination, dough sheeting means, a filler supplying hopper, means for directing sheets from said sheeting means into opposed spaced apart relation, and means for intermittently ejecting filler material from said hopper between said sheets and including an oscillating flap member in said hopper, a rotary shaft, crank arms on said flap and shaft, respectively, a variable throw lever, links connecting crank arms to said lever, respectively, one of said links being settable relative to said lever to vary the throw of the latter.

8. In a machine of the class described, in combination, dough sheeting means, a filler supplying hopper having an outlet, means for directing sheets from said sheeting means into opposed spaced apart relation, and means for ejecting filler material from said hopper between said sheets and including an oscillating flap member in said hopper above said outlet, a member in said hopper having an arcuate face concentric with the axis of oscillation of said flap for cooperation with one edge of the flap to close said hopper, and force the material beneath said flap from said outlet, and means for oscillating said flap including a shaft, a lever, crank arms on said flap and shaft, respectively, and links connecting said arms to said lever, respectively, the link connecting the shaft crank arm and lever being settable along said lever to vary the throw of the latter and said flap.

9. In a machine of the class described, in combination, dough sheeting means, a filler supplying hopper, having an outlet means for directing sheets from said sheeting means into opposed spaced apart relation, and means for ejecting filler material from said hopper between said sheets and including an oscillating flap member in said hopper above said outlet, a member in said hopper having an arcuate face concentric with the axis of oscillation of said flap for cooperation with one edge of the flap to close said hopper and force the material beneath said flap from said outlet, and means for oscillating said flap.

10. In a machine of the class described the combination with dough sheeting means including a pair of parallel rolls rotating in opposite directions, of means for kneading the dough in the hopper and forcing the same between said rolls and comprising a member rotating about an axis parallel with the axis of said rolls and including radial parts, one or the other of said parts in any position of said member urging the dough in the general direction of the feed of said rolls to continuously force said dough between said rolls and thereby facilitate formation by the latter of a sheet of uniform thickness and consistency, said parts subsequent to their dough forcing operation wiping against the sheeting roll rotating in the same direction as said member to sever the dough between said member and said roll to prevent winding of the dough on the member and relieve said rolls from back-drag of the dough.

11. In a machine of the class described the combination with a dough supply hopper and dough sheeting means including a pair of cooperating parallel rolls rotating in opposite directions, of means for kneading the dough in the hopper and forcing the same between said rolls and comprising a member rotating about an axis parallel with the axis of said rolls and including radial parts, one or the other of said parts in any position of said member urging the dough in the general direction of the feed of said rolls to continuously force the dough between said rolls and thereby facilitate formation by the latter of a sheet of uniform thickness and consistency, said parts subsequent to their dough forcing operation acting to sever the dough against the roll rotating in the same direction as said member and also to urge the dough away from said roll in a direction opposite to the direction of the feed of the rolls to relieve the latter of back drag of the dough and thereby obviate tearing the sheet.

LOUIS G. LOMBI.